Aug. 18, 1970     R. C. SWENGEL     3,524,963
METHOD AND MEANS FOR STRIKING AN ARC, AND FOR STRIKING
AN ARC FOR WELDING OR HEATING
Filed Feb. 17, 1965     3 Sheets-Sheet 1
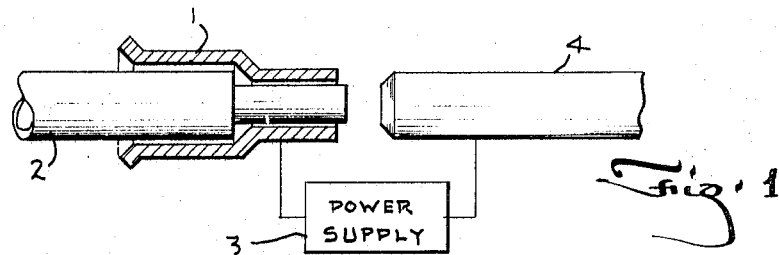
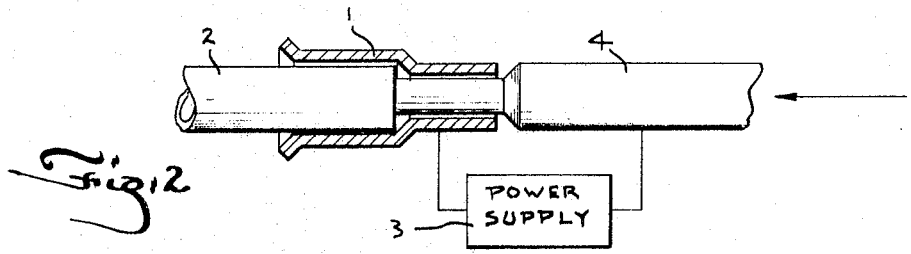
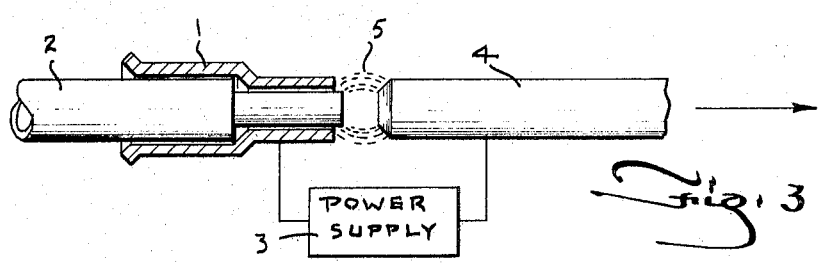
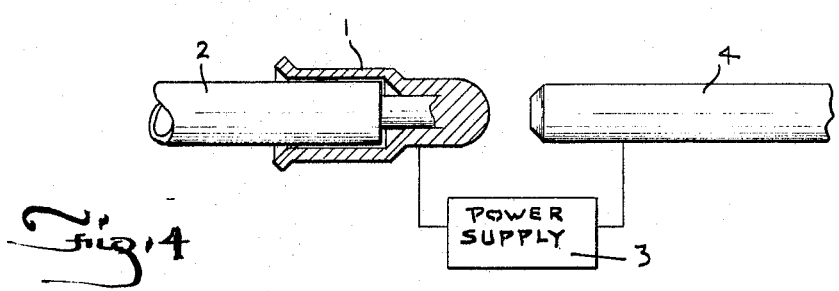
INVENTOR.
ROBERT CHARLES SWENGEL
BY Curtis, Morris & Safford INVENTOR.
ROBERT CHARLES SWENGEL
BY Curtis, Morris, & Safford

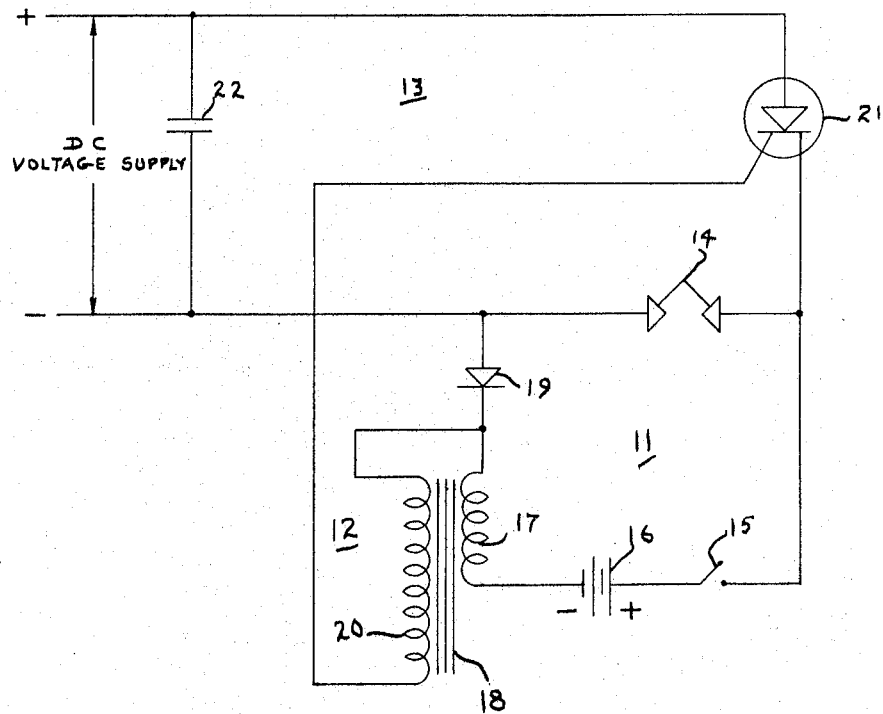

United States Patent Office 3,524,963
Patented Aug. 18, 1970

3,524,963
METHOD AND MEANS FOR STRIKING AN ARC, AND FOR STRIKING AN ARC FOR WELDING OR HEATING
Robert Charles Swengel, Hellam, Pa., assignor to AMP Incorporated, Harrisburg, Pa.
Filed Feb. 17, 1965, Ser. No. 433,350
Int. Cl. B23k 9/00
U.S. Cl. 219—100
15 Claims

ABSTRACT OF THE DISCLOSURE

An arc is struck for the purpose of welding two pieces together by bringing the pieces into engagement with each other to complete a circuit through a low energy circuit, the parts are moved away from each other so that the low energy circuit initiates an arc across the pieces as they are being moved away from each other and creates a trigger voltage which triggers a triggering means to discharge a capacitor across the pieces to enhance the arc.

Figure 5:
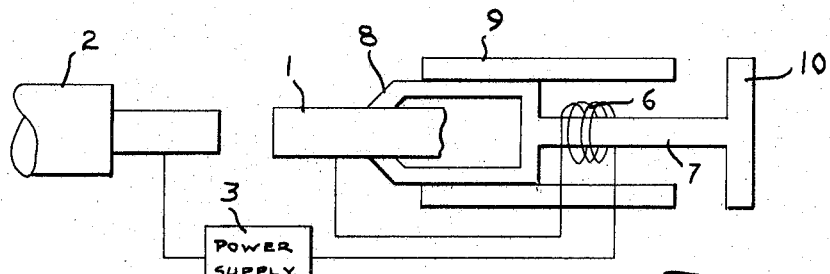

This invention relates to a method and means for striking an arc, and more particularly to a method and means for striking an arc for use for heating or melting metals.

For example, in the field of electrical connections wherein electrical conductors are joined to form contacts, it is common practice to effect these by soldering or crimping techniques. These soldered or crimped connections can have inherent weaknesses. In the case of the soldered connection, the integrity of the joint depends to a large degree on the skill of the operator making the connection. Due to the nature of the solder employed, there can also be mechanical failures resulting from long-term tensile strains. Connections made by crimping techniques, using well-designed tools and terminals, eliminate many of the variable skill requirements of the soldering process. The electrical contact between conductor and terminal, however, while possibly possessing a metal-to-metal bridge by cold-welding or solid-state diffusion, can be small in total contact area. Recently, therefore, greater attention has been given to methods and means for making electrical connections in which this contact area is greatly enhanced. Among the foremost of these is the method commonly called "fusion welding," whereby the two metals to be joined are held in close proximity and an arc struck between these and a non-consumable electrode is used to melt the metals in proximity and thus effect their joining by coalescing into a single metallic entity.

Another method is that of "arc-welding" which is similar in every respect to the fusion method previously described, with the exception that the separate electrode is consumable and the metal of the electrode is deposited on and becomes part of the metals being joined.

Still another method is that called "percussion welding" whereby the two metallic conductors to be joined are brought into reasonably close proximity to one another, an arc struck between the two, the two then being brought very quickly into physical contact with one another to effect a joining of the molten metals.

One of the major difficulties in the three previously mentioned methods of joining metals using arc heating processes is that of striking the arc.

The most common method is that of physically shorting the two metals between which the arc is to be drawn, the high current then vaporizing one or both of the metals and the arc plasma thus created. As often as not, this results in a form of contact welding, and the arc is extinguished and very high currents then are drawn from the source of electrical power. Thus it becomes necessary to restart the arc by physically breaking this joint and creating the plasma as the electrodes are being separated.

Another form of striking an arc for welding or heating processes is to impress a voltage upon the gap between the electrodes of a sufficiently high value to produce a momentary electrical discharge whose current, however, would be insufficient to perform the heating necessary to melt the metals. This discharge, which is more in the nature of a spark rather than a heating arc, nonetheless creates a conducting plasma which then acts to carry the higher currents of the main source of power. Normally the use of this higher voltage discharge to initiate the arc requires separate means, other than the main power supply, and generally is of a high frequency or steep rise time nature.

An exaggerated form of creating an arc by the initial contact of the two electrodes is obtained by the so-called projection type of welding. This is generally used only in percussion welding in which a geometrically specific projection or feather edge is formed upon one of the conductors to be joined, this small projection enhancing the probability of vaporization when the two conductors are first brought into contact, thus creating the arc plasma for heating, melting and subsequent joining purposes.

In the first method employed, that of shorting the electrode and the workpiece, difficulties arise in drawing large, short-circuit currents from the main power supply; these currents not only result in overloading the main power supply but have the tendency to weld the electrode to the workpiece. In the case of high-voltage discharge, a separate means of excitation is necessary to provide the high voltage necessary for striking the arc; this high voltage is also the source of possible radio frequency interference to other equipment, possible shock hazard to the operator; and, also, where the workpiece is connected to other sensitive equipment, electrical damage may result from this high voltage pulse. In some instances, capacitive shorting around the electrodes by the fixtures or adjacent structures can lower the high-pulse voltage and make arc-striking difficult or impossible.

The most critical feature of the exaggerated projection type of arc-striking is that the point or tip of the geometrically-altered electrode must be formed and held within rather critical dimensions, else the contact resistance of the contacting electrodes will be of such a low value that the projection will conduct the initial high current without vaporizing the metal, and thus not forming the arc whose heating effect is necessary for melting and joining the two conductors.

A primary object of the present invention is to provide a method for the initiation of an arc.

A further object of the present invention is the elimination of variables in the striking of an arc.

It is another object of the present invention to provide a means to initiate an arc.

An additional object of the present invention is to more effectively control the initiation of the arc.

A still further object of the invention is to allow the arc electrodes to be mechanically and electrically engaged while limiting the current drawn from the main source of electrical power.

Still a further object of the present invention is a provision of precisely controlling the striking of the arc.

Other objects and attainments of the present invention will become apparent to those skilled in the art upon a reading of the following detailed description when taken in conjunction with the drawings in which there are shown and described illustrative embodiments of the invention; it is to be understood, however, that these embodiments are not intended to be exhaustive nor limiting of the invention but are given for purposes of illustration in order that others skilled in the art may fully understand the invention and the principles thereof and the manner of applying it in practical use so that they may modify it in various forms, each as may be best suited to the conditions of a particular use.

In the drawings:

FIGS. 1–4 diagrammatically illustrate the various steps involved in initiating an arc and effecting a weld between two pieces of metal;

FIGS. 5–8 diagrammatically illustrate an alternative modification of striking an arc and effecting a weld; and FIG. 9 is a schematic diagram of an electric welding circuit.

The present invention will be described in conjunction with termination connections in the electrical field since a good welded connection provides a high order of reliability; however, it is to be understood that the present invention can be applied to the many phases of electric arc welding.

Turning now to the drawings, and more particularly to FIGS. 1–4, a suitable electrical connector or terminal 1 is disposed adjacent a conductor member 2. Connector or terminal 1 can take any suitable form. Connector 1 and conductor member 2 define a workpiece. One side of power supply 3 is connected to the workpiece while the other side of the power supply is connected to an electrode 4. Connector 1 is now ready to be welded to the wire core of conductor member 2.

As shown in FIG. 2, electrode 4 is moved into engagement with the workpiece. This movement can be effected manually or in any other suitable manner. When electrode 4 is in engagement with the workpiece, the electrode and the workpiece are in a quiescent state. When the electrode is moved away from the workpiece, as illustrated in FIG. 3, arc 5 is initiated or struck between the electrode and workpiece through power supply 3. During the operation of arc 5, connector 1 and the core of conductor member 2 of the workpiece are raised to a molten state and a fusion weld is effected therebetween as illustrated in FIG. 4. The duration of arc 5 is dependent upon the type of weld to be effected.

As can be discerned, no arc is struck as electrode 4 approaches the workpiece. This allows an operator to precisely place the electrode in the desired position on the workpiece without the accidental striking of the arc upon contact. No high voltage radio frequency type of discharge is necessary for striking the arc, thereby eliminating the possibility of possible shock hazard to the operator and damage to sensitive equipment that may be connected to the workpiece. Moreover, since the arc is not struck as the electrode moves toward the workpiece, the end of one of the electrodes does not have to be feathered or pointed.

Whereas in previous discussion the electrode 4 was used as part of the arc mechanism, it did not become part of the fusion weld being understood as consisting of a very high melting point material such as tungsten, carbon or the like; it is to be understood that electrode 4 could also be of a lower melting point material which would be acted upon by the heat and other arc mechanisms to be transferred to the fusion weld area and thus become part of the weld metal.

Turning now to FIGS. 5–8, there is diagrammatically illustrated a percussion welding arrangement. One side of power supply 3 is connected to the wire core of conductor member 2. The other side of power supply 3 is serially connected to a solenoid coil 6 and to terminal 1. Armature 7 is disposed within solenoid coil 6 and includes gripping jaws 8 in which terminal 1 is gripped. Guide and magnetic path means 9 is disposed adjacent jaws 8 in order to guide same upon the actuation of solenoid coil 6. A stop or magnetic member 10 is mounted on armature 7 and is engageable with means 9 in order to prevent armature 7 and gripping jaws 8 from moving outwardly from guide means 9.

Figure 6:
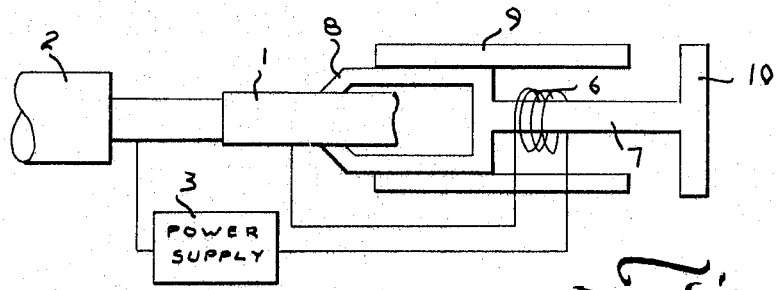
Figure 7:
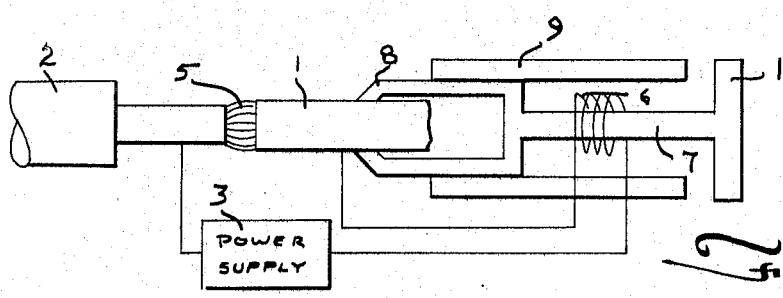

With terminal 1 disposed in gripping jaws 8 and connected to power supply 3 via coil 6 and with the wire core of conductor member 2 connected to the other side of power supply 3, conductor member 2 is brought into engagement with terminal 1, as illustrated in FIG. 6. Just as in the embodiment of FIGS. 1–4, as long as terminal 1 and conductor member 2 are maintained in engagement, no arc occurs between these elements. Upon a movement of conductor member 2 away from terminal 1, the power circuit of the power supply is actuated to ignite arc 5 between the gap created by the movement of conductor member 2 away from terminal 1, as illustrated in FIG. 7.

Figure 8:
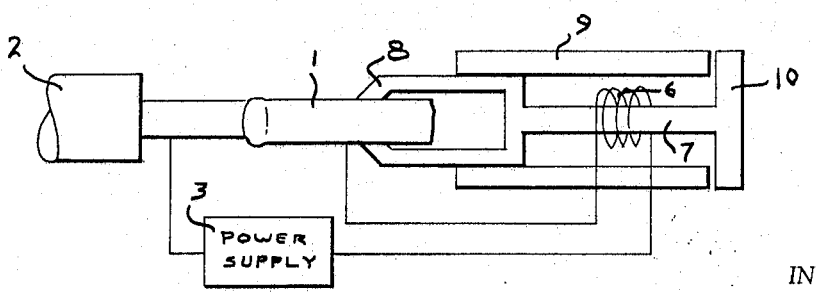

Soon after arc 5 has been created, solenoid coil 6 is actuated which moves armature 7, gripping jaws 8 and terminal 1 at a high velocity toward conductor member 2, causing terminal 1 to impact at a high rate of speed against the wire core of conductor member 2, as illustrated in FIG. 8. Since arc 5 has raised the wire core of conductor member 2 and terminal 1 to a molten state (i.e., the end surfaces across which arc 5 occurs), terminal 1 and conductor member 2 are effectively welded together. Thus, the arc is generated when conductor member 2 is moved away from terminal 1 and not when these elements are moved toward each other, and neither one of these elements has to have a feathered or pointed end in order to effectively strike the arc.

No delay circuit is deemed to be necessary to actuate solenoid coil 6 since the mass of armature 7, gripping jaws 8, stop member 10 and terminal 1 provides sufficient delay to allow arc 5 to cause the surfaces between which the arc occurs to attain a molten state before they are impacted together to achieve a welded connection; however, cases may arise where a delay circuit is deemed to be necessary and such delay circuit could readily be connected between power supply 3 and solenoid coil 6 without departing from the spirit of the instant invention.

Instead of welding a conductor member to a terminal, conductor members can be connected to the power supply and be welded together in the manner set forth hereinabove.

While conductor member 2 has been illustrated as being stripped, it is within the purview of the present invention to effect a weld between an unstripped conductor member and the terminal in the embodiment of FIGS. 5–8, since the force of the impact of the terminal onto the end of the conductor member would cause the insulation to be peeled back from the end of the wire core. The terminal would take the form of insulated parts, each connected to a side of the power supply.

A suitable power supply circuit to perform the welding concepts disclosed in FIGS. 1–8 is illustrated in FIG. 9, and includes a sensing and arc-initiating circuit 11, a control-triggering circuit 12 and a power circuit 13. Sensing and arc-initiating circuit 11 includes, in series relationship, electrodes 14 between which the arc occurs, a single pole, single throw switch 15, a source of supply 16, primary winding 17 of a transformer 18 and diode 19. Switch 15 is preferably a mercury switch to obviate any arcing which might trigger power circuit 13. Source of supply 16 can be any suitable voltage supply to provide bias and arc-initiating voltage and current.

Control-triggering circuit 12 includes secondary winding 20 of transformer 18 having one side connected between diode 19 and primary winding 17, while the other side is serially connected to the gate of a silicon-controlled rectifier 21. Power circuit 13 includes a capacitor or storage means 22 connected in shunt across a suitable DC voltage supply. One side of capacitor means 22 is connected in series with the anode of SCR 21, while the other side is connected in series with one of electrodes 14. The other electrode is connected in series with the cathode of SCR 21. The value of the DC voltage supply and that of capacitor or storage means 22 are in accordance with principles well-known to those skilled in the art, and in accordance with the nature of the welding to be performed to produce sufficient power over a suitable duration of time.

OPERATION

In its quiescent state, as illustrated in FIG. 9, capacitor means 22 is charged to the value of the DC voltage supply, electrodes 14 are spaced from each other to define an open circuit, switch 15 is in its closed position, bias supply 16 supplies a negative bias to the gate of SCR 21 through primary winding 17 and secondary winding 20 of transformer 18. Thus, the only current drawn on the bias supply is leakage current of the SCR which is negligible and no current is drawn from capacitor means 22 due to the fact that electrodes 14 are spaced from one another.

Upon closing the arc gap by shorting electrodes 14, the negative bias voltage on the SCR gate is reduced almost to zero depending upon the resistance of the arc-gop bath or circuit. Since the gate is not positive with respect to the cathode but at most zero therewith, the SCR will not conduct in this condition. Also, due to the low resistance of the bias circuit, which is shorted through the primary winding of transformer 18 when the arc gap is closed, an inductive field is produced across the core of transformer 18.

Upon opening the arc gap, the immediate effect of the collapsing lines of magnetic force in the core of transformer 18 is to initiate a small spark at the arc gap since this is in series with the bias supply and the primary winding of transformer 18. Also, due to the collapse of the magnetic field in the transformer, a positive pulse is supplied by the secondary winding of transformer 18, and, in turn, is transmitted to the gate of SCR 21. Since the gate of SCR 21 is now positive with respect to the cathode, the SCR now begins to conduct and allows the full voltage of capacitor means 22 to appear across the arc gap. Capacitor means 22 then continues to discharge across the arc gap as a load until the voltage of capacitor means 22 falls below that required to keep the arc discharge alive.

During the period that the arc discharge is in progress, there is a voltage drop across the arc, the polarity being the same as that of the bias supply. Diode 19 acts to prevent a loss of arc energy by blocking the passage of any current to the sensing and arc-initiating circuit so that no negative pulse of any magnitude can be applied to the gate of the SCR from this source that might conceivably interrupt the operation of the arc.

Thus, as can be discerned, when electrodes 14 are brought into engagement, sensing and arc-initiating circuit 11 does not actuate control-triggering circuit 12 until electrodes 14 are in the process of being moved slightly away from each other; then, arc-initiating circuit 11 actuates control-triggering circuit 12 which, in turn, causes power circut 13 to apply its load from capacitor or storage means 22 across the gap created between electrodes 14 to supply an arc to effect a welding operation.

The maximum voltage for striking the arc need not exceed the voltage of the power supply, and the voltage of the established arc is a function of the resistance of the arc and its self-regulating properties.

The above-mentioned, simple and unique circuit arrangement provides the following features: (1) stores or has available a source of DC voltage and current of considerable magnitude; (2) is able to short two electrodes which ostensibly connect thereacross the source of supply of (1) without drawing any appreciable amount of current therefrom so long as the electrodes remain in engagement; (3) have the full voltage and current of (1) appear across the electrodes as an arc upon separation of the shorted electrodes; and (4) continue to draw current from the supply of (1) until it becomes exhausted or lowered to the point that it can no longer supply sufficient current and voltage to maintain the arc.

It will, therefore, be appreciated that the aforementioned and other desirable objects have been achieved; however, it should be emphasized that the particular embodiments of the invention, which are shown and described herein, are intended as merely illustrative and not as restrictive of the invention.

What is claimed is:

1. An energy storage circuit for use in striking an arc comprising a capacitor and triggerable means connected in series with electrodes across which the arc is to be struck, and low voltage circuit means connected to said electrodes and triggerable means, said low voltage circuit means being completed upon engagement of the electrodes without triggering said triggerable means and thereby discharging said capacitor, said arc being established when the electrodes are moved away from each other and said triggerable means being triggered upon the movement of the electrodes away from each other to discharge said capacitor to enhance and maintain said arc across the electrodes.

2. An arc welding system for welding a pair of pieces together comprising a first circuit including said pieces for charging a capacitor to provide a source of potential sufficient to effect the weld, a second circuit connected to said first circuit and to said pieces having a potential insufficient to effect the weld, energization of said second circuit being effected through the pieces to be welded which maintains said first circuit in a deenergized state so long as said second circuit remains in an energized state, means in said first circuit to discharge said capacitor, said second circuit initiating an arc at the pieces when the second circuit is deenergized at said pieces, and means in said second circuit to actuate said discharge means to discharge said capacitor to enhance the arc and effect the weld of said pieces.

3. In a welding system, a power circuit having power storage means, power-actuating means and electrode means therein, an arc-initiating circuit connected to said power circuit across said electrode means, said arc-initiating circuit being energized upon said electrode means being brought into engagement without said power circuit being energized so long as said electrode means remain in engagement, said arc-initiating circuit initiating an arc across said electrode means upon said electrode means being moved away from each other, and a control circuit connected between said arc-initiating circuit and said power-actuating means, said power-actuating means being actuated by said control circuit simultaneously with the formation of the arc to cause said power storage means to discharge the power thereof across said electrode means to enhance and maintain the arc.

4. An arc-welding circuit comprising electrode means for effecting a weld, a first circuit including capacitor means and triggerable means connected to said electrode means to provide sufficient power to effect the weld, a second circuit connected to said electrode means having insufficient power to accomplish the weld but capable of initiating an arc across the electrode means upon the electrode means being moved out of physical contact, said first circuit being maintained in a deenergized state so long as the electrode means remain in physical contact, and a third circuit connected between the second circuit and said triggerable means, said third circuit being energized simultaneously with the initiation of the arc to provide a trigger source to said triggerable means to cause said triggerable means to discharge said capacitor means across the electrode means to enhance and maintain the arc to effect the weld.

5. An arc welding system for welding a pair of pieces together comprising a first circuit including said pieces and energy supply means to provide a source of potential sufficient to effect the weld, a second circuit connected to said first circuit and to said pieces having a potential insufficient to effect the weld, energization of said second circuit being effected through the pieces to be welded which maintains said first circuit in a deenergized state so long as said second circuit remains in an energized state, discharge means in said first circuit to connect said energy supply means to said electrodes, said second circuit initiating an arc at the pieces when the second circuit is deenergized at said pieces, and means in said second circuit to actuate said discharge means to enhance the arc and effect the weld of said pieces.

6. A method of striking an arc comprising the steps of bringing pieces across which the arc is to be established into engagement to complete a sensing and arc-initiating circuit to energize said sensing and arc-initiating circuit which maintains a main power circuit de-energized as long as said sensing and arc-initiating circuit remains energized, and moving one of the pieces away from the other piece causing the sensing and arc-initiating circuit to initiate a low voltage arc and to actuate a control-triggering circuit which triggers said main power circuit thereby enhancing and maintaining the arc across said pieces.

7. A method of welding pieces of metal together comprising the steps of bringing the pieces to be welded together into engagement to complete and thereby energize a sensing and arc-initiating circuit which prepares a control-triggering circuit and the energization of said sensing and arc-initiating circuit maintains a main power circuit de-energized as long as said sensing and arc-initiating circuit remains energized, and moving one of the pieces away from the other causing the sensing and arc-initiating circuit to initiate a low voltage arc and to actuate said control-triggering circuit which triggers said main power circuit thereby enhancing and maintaining the arc across said pieces to effect a weld therebetween when the pieces are brought together.

8. A method of striking an arc comprising the steps of bringing pieces of material across which the arc is to be established into engagement to complete a sensing and arc-initiating circuit to energize said sensing and arc-initiating circuit which maintains a main power circuit de-energized as long as said sensing and arc-initiating circuit remains energized, and moving the pieces away from each other causing the sensing and arc-initiating circuit to initiate a low voltage arc and to actuate a control-triggering circuit which triggers said main power circuit thereby enhancing and maintaining the arc across said pieces.

9. A method of striking an arc between two pieces of material having power circuit means connected thereto comprising the steps of shorting the pieces together to close and thereby energize a sensing and arc-initiating circuit, maintaining said power circuit means de-energized as long as said sensing and arc-initiating circuit is energized, preparing a control-triggering circuit, moving the pieces away from each other with the arc-initiating circuit actuating a first power circuit means thereby causing the arc to begin across the pieces and the control-triggering circuit to be actuated, sending a trigger voltage from the control-triggering circuit to a second power circuit means, and actuating the second power circuit means from the trigger voltage to add the power therefrom to the arc and maintain the arc across the pieces.

10. A method of striking an arc between pieces of material comprising the steps of applying a first power circuit to the pieces, applying a second power circuit to the pieces, bringing the pieces into contact with each other to complete the second power circuit and to maintain said first power circuit de-energized as long as said second power circuit is energized, moving the pieces away from each other thereby causing the second power circuit to initiate the arc across the pieces, and sending a voltage from the second power circuit to a triggering member in said first power circuit which causes the triggering member to apply the power of the first power circuit to maintain the arc across the pieces.

11. A method of welding by the discharge of capacitor means comprising the steps of effecting engagement of parts to be welded to complete a circuit through a low energy circuit to energize same and to maintain the capacitor means in a non-discharging state as long as said low energy circuit is energized, moving the parts away from each other so that said low energy circuit initiates an arc across the parts and creates a triggering voltage, and feeding the triggering voltage to a triggering means to discharge the capacitor means across the parts to enhance the arc.

12. A method of welding by the discharge of a power storage means comprising the steps of effecting engagement of parts to be welded to complete a circuit through a low energy circuit to energize same and to maintain the power storage means in a non-discharging state as long as said low energy circuit is energized, moving the parts away from each other so that said low energy circuit initiates an arc across the parts and creates a triggering voltage simultaneously with the moving of the parts, and sending the triggering voltage to a triggerable member connected to the power storage means to discharge the power storage means across the parts to enhance and maintain the arc.

13. A method of welding by the discharge of a capacitor in a power circuit comprising the steps of effecting engagement of parts to be welded to complete a circuit through a low energy circuit to energize same and to maintain the power circuit de-energized as long as said low energy circuit is energized, preparing a triggering circuit, moving the parts away from each other so that the low energy circuit initiates an arc across the parts and creates a triggering voltage in the triggering circuit, transmitting the triggering voltage to a triggerable member connected to the capacitor to discharge the capacitor across the parts to enhance and maintain the arc.

14. A method of welding pieces together by the discharge of a capacitor comprising the steps of effecting engagement of the pieces to be welded to complete a low voltage circuit to energize same and to maintain the capacitor in a non-discharging state as long as said low voltage circuit is energized, moving the pieces relatively away from each other so the low voltage circuit initiates an arc across the pieces and createst a triggering voltage simultaneously with the initiation of the arc, sending the triggering voltage to a triggerable member connected to the capacitor to discharge same across the pieces to enhance the arc, and moving one of the pieces toward the other to effect a weld between the pieces.

15. A method of striking and enhancing an arc comprising the steps of bringing pieces across which the arc is to be established into engagement to complete a sensing and arc-initiating circuit to energize said sensing and arc-initiating circuit which maintains a main power circuit de-energized as long as said sensing and arc-initiating circuit remains energized, and moving one of the pieces away from the other of the pieces causing the sensing and arc-initiating circuit to inate a low voltage arc between the pieces and to actuate a control-triggering circuit which triggers said main power circuit into completing its conduction path through the already established arc thus enhancing and maintaining the arc across said pieces.

References Cited

UNITED STATES PATENTS

| | | | |
|---|---|---|---|
| 2,648,748 | 8/1953 | Sayer | 219—98 |
| 3,291,958 | 12/1966 | Glorioso | 219—98 |
| 3,319,039 | 5/1967 | Glorioso | 219—98 |
| 3,243,654 | 3/1966 | Wright | 315—241 X |

JOSEPH V. TRUHE, Primary Examiner

R. E. O'NEILL, Assistant Examiner

U.S. Cl. X.R.

219—98; 307—252; 314—66; 320—1